United States Patent [19]
Ridland

[11] Patent Number: 5,688,894
[45] Date of Patent: Nov. 18, 1997

[54] POLYESTER RESIN POWDER COATING COMPOSITIONS

[75] Inventor: John Ridland, Durham, England

[73] Assignee: Tioxide Specialties Limited, United Kingdom

[21] Appl. No.: 493,183

[22] Filed: Jun. 20, 1995

[30] Foreign Application Priority Data

Jun. 28, 1994 [GB] United Kingdom ............... 9412908

[51] Int. Cl.$^6$ ................................................. C08G 63/00
[52] U.S. Cl. ............... 528/176; 264/176.1; 264/211.24; 428/423.7; 428/457; 528/480
[58] Field of Search ..................... 528/176, 480; 502/150, 349, 350; 264/176.1, 211.24; 428/423.7, 457

[56] References Cited

U.S. PATENT DOCUMENTS

| | | |
|---|---|---|
| 4,066,593 | 1/1978 | Czajka et al. |
| 4,115,337 | 9/1978 | Cancilleri |
| 4,260,735 | 4/1981 | Bander et al. |
| 4,788,172 | 11/1988 | Deardorff |
| 5,391,643 | 2/1995 | Ridland et al. |

FOREIGN PATENT DOCUMENTS

| | | |
|---|---|---|
| 52-081346 | 7/1977 | Japan. |
| 53-073225 | 6/1978 | Japan. |
| 53-073226 | 6/1978 | Japan. |
| 55-116761 | 9/1980 | Japan. |
| 56-074155 | 6/1981 | Japan. |
| 57-044681 | 3/1982 | Japan. |
| 57-096056 | 6/1982 | Japan. |
| 62-250025 | 10/1987 | Japan. |
| 0 994 717 | 6/1965 | United Kingdom. |
| 1 516 829 | 7/1978 | United Kingdom. |
| 1 566 060 | 4/1980 | United Kingdom. |

*Primary Examiner*—Terressa Mosley

[57] ABSTRACT

A method of curing a powder coating composition comprises reacting a polyester resin with an alkanolamine derivative of titanium or zirconium. This derivative is the reaction product of an orthoester or a condensed orthoester of titanium or zirconium with a trialkanolamine and with a dialkanolamine or a monoalkanolamine. In the reaction product the ratio of trialkanolamino radicals to Ti or Zr atoms is from 0.5:1 to 1.5:1 and the ratio of monoalkanolamino radicals or dialkanolamino radicals to Ti or Zr atoms is from 0.2:1 to 2.0:1. The reaction products are preferably derivatives of ethanolamines or isopropanolamines and can be used to cure carboxyl-rich resins or hydroxyl-rich resins.

23 Claims, No Drawings

POLYESTER RESIN POWDER COATING COMPOSITIONS

This invention relates to powder coating compositions based on polyester resins and in particular to the use of certain organotitanium or organozirconium compounds to cure polyester resin powder coating compositions.

Coating compositions comprising powdered thermosetting compositions are increasingly used for the formation of highly durable and decorative finishes. Such compositions, usually known as powder coating compositions are frequently based on polyester resins which can be prepared by the reaction of polyhydric alcohols and polybasic acids and in which the molar ratio of alcohol to acid can be adjusted to produce resins which contain an excess of hydroxyl groups over acid groups (hydroxyl-rich resins) or resins which contain an excess of acid groups over hydroxyl groups (carboxyl-rich resins).

The carboxyl-rich resins are frequently cured by cross-linking with an isocyanurate such as triglycidyl isocyanurate (TGIC) to produce durable coatings ideally suitable for exterior use. However, there is now a desire to reduce the use of triglycidyl isocyanurate.

Cross-linking of carboxyl-rich resins with epoxy resins such as resins based on bisphenol A is known to produce resins which are frequently called hybrid resins. However these resins do not possess the same properties or exterior durability as those produced by cross-linking with triglycidyl isocyanurate.

Coatings having good exterior durability can also be produced by cross-linking hydroxyl-rich resins with isocyanates. These isocyanates may be blocked, for example with caprolactam, to prevent premature reaction with the polyester. However, there is now a general trend within the coating industry to avoid the use of caprolactam-blocked isocyanates when possible.

Our co-pending application GB 9408430.8 discloses a method of curing polyester powder coatings using specified organotitanium or organozirconium compounds which are derivatives of a trialkanolamine.

It has now been found, surprisingly, that certain organotitanium or organozirconium compounds derived from monoalkanolamines or dialkanolamines in addition to trialkanolamines are useful as curing agents for polyester powder coating compositions.

Accordingly, a method of curing a powder coating composition comprises reacting a polyester resin with an organotitanium compound or an organozirconium compound which is the reaction product of an orthoester or a condensed orthoester of titanium or zirconium with a trialkanolamine and with a monoalkanolamine or a dialkanolamine, said reaction product having a ratio of trialkanolamino radicals to titanium or zirconium atoms of from 0.5:1 to 1.5:1 and a ratio of monoalkanolamino radicals or dialkanolamino radicals to titanium or zirconium atoms of from 0.2:1 to 2.0:1.

The polyester resins which can be used in the method of the invention can be those which are described as hydroxyl-rich or those which are described as carboxyl-rich. They can be prepared from polybasic carboxylic acids or their esterifiable derivatives and from polyols by any suitable known process.

Polybasic acids which are useful for their preparation include aromatic, cycloaliphatic or aliphatic carboxylic acids such as terephthalic acid, isophthalic acid, phthalic acid, trimellitic acid, pyromellitic acid, hexahydrophthalic acid, adipic acid and sebacic acid. Esters of these acids with monohydric alcohols, for example dimethyl terephthalate or acid anhydrides such as phthalic anhydride can also be used as reactants for preparing the polyesters in place of the equivalent acid.

Suitable polyhydric alcohols include 1,2-ethanediol (ethylene glycol), 1,2-propanediol, trimethylolpropane, neopentyl glycol, 1,3-butanediol, 1,4-butanediol, pentaerythritol, glycerol, tris(hydroxyethyl)isocyanurate and ethoxylated bisphenol A (2,2-bis[4,4'-hydroxyethoxyphenyl]propane).

Preferably the polyesters are branched and have a high melting point.

The molar ratio of the raw materials used for polyester production is selected so as to ensure an excess of either hydroxyl groups (hydroxyl-rich resins) or carboxyl groups (carboxyl-rich resins). Typically, hydroxyl-rich resins which are commercially available have a hydroxyl number between 20 and 150 mg KOH per gram. For the practice of this invention the preferred hydroxyl number is between 15 and 100 mg KOH per gram and more preferably between 15 and 60 mg KOH per gram. Such resins usually have an acid number of from 0 to 15 mg KOH per gram. Typical, commercially available, carboxyl-rich resins which are of use in the method of the invention have an acid number of from 15 to 100 mg KOH per gram and preferably from 15 to 60 mg KOH per gram and a hydroxyl number of less than 30 mg KOH per gram and preferably less than 10 mg KOH per gram.

Resins which are a copolymer of a polyester and another polymer are useful in the practice of the invention and such copolymers include copolymers of acrylic polymers containing carboxyl groups.

The titanium or zirconium compounds which are of use in the method of the invention are derivatives of at least two alkanolamines. One of these alkanolamines is a trialkanolamine which can be represented by the general formula $N(ROH)_3$ and the other is a dialkanolamine [general formula $HN(ROH)_2$] or a monoalkanolamine [general formula $H_2NROH$]. In each of the formulae, R represents a divalent radical, preferably containing up to 3 carbon atoms. More preferably, R is —$CH_2$—$CH_2$— or —$CH(CH_3)CH_2$—. When R represents one of these radicals the trialkanolamine is triethanolamine or triisopropanolamine, the dialkanolamine is diethanolamine or diisopropanolamine and the monoalkanolamine is monoethanolamine or monoisopropanolamine. Usually, but not necessarily, an organotitanium or organozirconium compound useful in the invention will be derived from a trialkanolamine and another alkanolamine wherein R represents the same group in each alkanolamine.

The titanium or zirconium compounds are characterised by the proportions of trialkanolamino radicals and monoalkanolamino or dialkanolamino radicals present in the reaction product. The ratio of trialkanolamino radicals to titanium or zirconium atoms is from 0.5:1 to 1.5:1 and preferably from 1.0:1 to 1.5:1.

The ratio of monoalkanolamino or dialkanolamino radicals to titanium or zirconium atoms is from 0.2:1 to 2.0:1 and preferably from 0.3:1 to 1.0:1.

The organotitanium or organozirconium compounds are reaction products of alkanolamines with a titanium or zirconium orthoester or a condensed orthoester of titanium or zirconium. The orthoesters can be represented by the formula $M(OR')_4$ and the condensed orthoesters by the formula $R'—[OM(OR')_2]_x—OR'$ in which M represents titanium or zirconium, R' is an alkyl radical or a radical containing one or more ether linkages and x is an integer. The condensed orthoesters can be prepared by controlled hydrolysis of orthoesters. Usually, R' contains up to 8 carbon atoms and preferably up to 6 carbon atoms. Preferably x is from 2 to 4. Suitable examples of orthoesters or condensed orthoesters include tetraisopropoxy titanium, tetraethoxy titanium, tetra-n-butoxy titanium, tetrakis(2-ethylhexoxy) titanium, tetrakis-(2-ethoxyethoxy) titanium, polybutyl titanate, tetra-n-propoxy zirconium and tetra-n-butoxy zirconium.

The organotitanium or organozirconium compounds can be readily prepared by reaction of chosen alkanolamines with a titanium or zirconium orthoester or condensed orthoester in an appropriate molar ratio followed by the removal of alcohol which is displaced. For example, reaction of 3 moles of triethanolamine and 2 moles of diethanolamine with 3 moles of tetraisopropoxy titanium followed by removal of isopropyl alcohol generated produces an organotitanium compound suitable for use in the method of the invention.

The quantity of organotitanium or organozirconium compound used in the method of the invention depends on, amongst other factors, the desired degree of cross-linking of the polyester resin and the nature of the polyester resin. Generally, from 2 to 20 per cent by weight is used and preferably the quantity is from 5 to 8 per cent by weight based on weight of resin.

Before curing the powder coating composition the organotitanium or organozirconium compound is thoroughly mixed with the polyester resin. Typically, the resin and organotitanium or organozirconium compound, together with other ingredients such as pigments and flow modifiers are firstly mixed as a powder in a high intensity mixer such as Henschel mixer. Suitable pigments include inorganic pigments such as titanium dioxide and iron oxide and organic pigments such as carbon black and phthalocyanine blue. In addition inorganic extenders such as barium sulphate or calcium carbonate may be added as part of the pigmentary system. Compounds which are useful as flow modifiers include silicones and polyacrylates such as polybutyl acrylate and butyl/ethylhexyl acrylate copolymers.

The mixed powder is usually subsequently fed to an extruder of a type conventionally used for powder coating compositions such as a Buss-Ko-Kneader PR46. The extruder forms a semi-molten mass from the mixed powder at a temperature of about 90° C. to 120° C. and this extrudate is cooled to form a brittle solid which is then pulverised in a suitable mill such as a pin mill, to produce a powder coating composition. Usually the powder coating is sieved before application to ensure the absence of oversized particles.

In use the powder coating composition is coated on to the surface to be treated in any convenient manner. For the treatment of aluminium or steel, for example, electrostatic spraying is commonly employed as this technique produces a very uniform coating even on inaccessible surfaces. An alternative technique which is extremely useful is triboelectric spraying.

The coated surface is then heated to a sufficiently high temperature to allow the resin to coalesce and cure by cross-linking the free hydroxyl or carboxyl groups in the polyester resin by means of the organotitanium or organozirconium compound. The temperature at which the resin is cured depends to some extent upon the glass transition temperature and the softening point of the resin and the reactivity of the cross-linking agent but generally is in the range 140° C. to 220° C. The resin is normally fully cured by heating at a temperature in this range for a period of between 5 and 30 minutes, more usually between 5 and 20 minutes. Typical curing schedules for carboxyl-rich polymers are 15 to 20 minutes at 160° C., 10 to 20 minutes at 180° C. or 6 to 10 minutes at 200° C. For hydroxyl-rich resins typical schedules are 15 to 20 minutes at 190° C. or 10 to 15 minutes at 200° C.

A number of well-known tests are used to assess the quality of the finished coating. Typically, a methyl ethyl ketone double-rub test is used to assess the degree of cure and reverse impact and bend tests are used to confirm the degree of cross-linking and to assess the integrity of the coating and its bonding to the coated surfaces. Colour and gloss of the finished coatings are also important properties of the cured resin.

The coatings cured according to the method of the current invention are of acceptable quality when assessed by these tests. The organotitanium and organozirconium compounds are active cross-linkers which are solid and have a low volatility.

The invention is illustrated by the following examples.

EXAMPLE 1

Triethanolamine (447.6 g, 3 moles) and diethanolamine (105.1 g, 1 mole) were added to tetraisopropoxy titanium (852 g, 3 moles) in a rotary evaporator flask and mixed for 10 minutes under nitrogen. The solution was heated under vacuum to remove isopropanol and yield a yellow resinous solid having a titanium content of 17.53% by weight.

EXAMPLE 2

Triethanolamine (447.6 g, 3 moles) and diethanolamine (210.2 g, 2 moles) were added to tetraisopropoxy titanium (852 g, 3 moles) in a rotary evaporator flask and mixed for 10 minutes under nitrogen. The solution was heated under vacuum to remove isopropanol and yield a yellow resinous solid having a titanium content of 16.37% by weight.

EXAMPLE 3

Triethanolamine (74.6g, 0.5 moles) and monoethanolamine ( 10.2 g, 0.17 moles) were added to tetraisopropoxy titanium (142 g, 0.5 moles) in a rotary evaporator flask and mixed for 5 minutes under nitrogen. The solution was heated under vacuum to remove isopropanol and yield a yellow resinous solid having a titanium content of 19.01% by weight.

EXAMPLE 4

Triethanolamine (74.6 g, 0.5 moles) and monoethanolamine (20.3 g, 0.33 moles) were added to tetraisopropoxy titanium (142 g, 0.5 moles) in a rotary evaporator flask and mixed for 5 minutes under nitrogen. The solution was heated under vacuum to remove isopropanol and yield a yellow resinous solid having a titanium content of 17.54% by weight.

EXAMPLE 5

Reactivity Test

The reactivity of the organotitanium or organozirconium cross-linkers towards polyester resins can be simply checked using a gel time test. 7 parts cross-linker were ground with 93 parts polyester resin (see Table 1 ) with a mortar and pestle. Approximately 0.7g of this mixture was placed in a depression in a thermostatically controlled heated aluminium block. The temperature was preset to 200° C. The molten mixture was stirred with a wooden cocktail stick and the time in seconds noted for gelation (snapback of molten thread) to occur. When gelation did not occur within 360 seconds the appearance of the resin after 360 seconds was noted and is described in Table 2.

TABLE 1

| RESIN | OH Value | Acid Value | Viscosity at 165° C. |
|---|---|---|---|
| Uralac P2400 (1) | — | 30–37 mg/KOH/g | 700 dPa · s |
| Uralac P2115 (1) | 30–45 | 10 max mg/KOH/g | 550 dPa · s |
| Neocrest P660 (2) | — | 28–40 mg/KOH/g | |

(1) Supplied by DSM resins
(2) Supplied by Zeneca resins

TABLE 2

| Product of Example No. | Gel time (secs) at 200° C. | | |
|---|---|---|---|
| | P2115 | P2400 | P660 |
| 1 | 210 | 190 | 155 |
| 2 | No gel | 325 | 200 |
| 3 | 255 | 180 | 270 |
| 4 | 270 | 240 | 285 |

I claim:

1. A method of curing a powder coating composition comprising heating a polyester resin with an alkanolamine derivative of a metal selected from the group consisting of titanium and zirconium to a sufficiently high temperature to cause said alkanolamine derivative of a metal to react with and cross-link said polyester resin, said alkanolamine derivative of a metal being the reaction product of an organometallic compound selected from orthoesters and condensed orthoesters of said metal with a first alkanolamine which is a trialkanolamine and with a second alkanolamine selected from the group consisting of dialkanolamines having the formula $HN(ROH)_2$ and monoalkanolamines having the formula $H_2NROH$ where, in each formula, R represents a divalent radical, said reaction product containing trialkanolamino radicals derived from said first alkanolamine and alkanolamino radicals derived from said second alkanolamine and said reaction product having a ratio of trialkanolamino radicals to atoms of said metal in the range 0.5:1 to 1.5:1 and a ratio of alkanolamino radicals to atoms of said metal in the range 0.2:1 to 2.0:1.

2. A method according to claim 1 in which the trialkanolamine is selected from the group consisting of triethanolamine and triisopropanolamine.

3. A method according to claim 1 in which the second alkanolamine is selected from the group consisting of diethanolamine, diisopropanolamine, monoethanolamine and monoisopropanolamine.

4. A method according to claim 1 in which the trialkanolamine has the formula $N(ROH)_3$, the dialkanolamine has the formula $HN(KOH)_2$ and the monoalkanolamine has the formula $H_2NROH$ wherein, in each formula, R represents a divalent radical, said divalent radical being the same in each of the alkanolamines used in the method.

5. A method according to claim 1 in which the ratio of trialkanolamino radicals to titanium or zirconium atoms is from 1.0:1 to 1.5:1.

6. A method according to claim 1 in which the ratio of alkanolamino radicals to titanium or zirconium atoms is from 0.3:1 to 1.0:1.

7. A method according to claim 1 in which the orthoester ester of titanium or zirconium is represented by the formula $M(OR')_4$ and the condensed orthoester is represented by the formula $R'—(OM(OR')_2)—OR'$ wherein, in each formula, M represents a metal selected from the group consisting of titanium and zirconium, R' is an alkyl radical or a radical containing one or more ether linkages and containing up to eight carbon atoms and x is an integer.

8. A method according to claim 7 in which x is an integer from 2 to 4.

9. A method according to claim 1 in which the polyester resin is an ester of an acid selected from the group consisting of terephthalic acid, isophthalic acid, phthalic acid, trimellitic acid, pyromellitic acid, hexahydrophthalic acid, adipic acid and sebacic acid.

10. A method according to claim 1 in which the polyester resin is an ester of a polyol selected from the group consisting of 1,2-ethanediol, 1,2-propanediol, trimethylolpropane, neopentyl glycol, 1,3-butanediol, 1,4-butanediol, pentaerythritol, glycerol, tris(hydroxyethyl) isocyanurate or ethoxylated bisphenol A.

11. A method according to claim 1 in which the polyester resin is a hydroxyl-rich resin having a hydroxyl number in the range 20 to 150 mg KOH per gram.

12. A method according to claim 11 in which the polyester resin has an acid number in the range 0 to 15 mg KOH per gram.

13. A method according to claim 1 in which the polyester resin is a carboxyl-rich resin having an acid number in the range 15 to 100 mg KOH per gram.

14. A method according to claim 13 in which the polyester resin has a hydroxyl number of less than 30 mg KOH per gram.

15. A method according to claim 1 in which the polyester resin is a copolymer of an acrylic polymer containing carboxyl groups.

16. A method according to claim 1 in which the alkanolamine derivative of a metal is present in an mount in the range 2 to 20 per cent by weight based on weight of resin.

17. A method according to claim 1 in which the powder coating composition is cured by reacting the polyester resin with the alkanolamine derivative of a metal at a temperature in the range 140° C. to 220° C.

18. A method according to claim 17 in which the powder coating composition is cured for a period in the range 5 to 30 minutes.

19. A method according to claim 1 in which an additive selected from the group consisting of pigments, extenders and flow modifiers is mixed with the polyester resin and the alkanolamine derivative of a metal before the powder coating compositon is cured.

20. A method according to claim 19 in which the pigment is selected from the group consisting of titanium dioxide, iron oxide, carbon black and phthalocyanine blue.

21. A method according to claim 19 in which the flow modifier is selected from the group consisting of silicones, polybutyl acrylate and copolymers of butyl acrylate and ethylhexyl acrylate.

22. A method according to claim 1 in which the polyester resin is mixed with the alkanolamine derivative of a metal and the mixture so formed is extruded at a temperature of 90° C. to 120° C. and subsequently pulverised.

23. A composition suitable for use as a powder coating comprising a mixture of a polyester resin with an alkanolamine derivative of a metal selected from the group consisting of titanium and zirconium, said alkanolamine derivative of a metal being the reaction product of an organometallic compound selected from orthoesters and condensed orthoesters of said metal with a first alkanolamine which is a trialkanolamine and with a second alkanolamine selected from the group consisting of dialkanolamines having the formula $HN(ROH)_2$ and monoalkanolamines having the formula $H_2NROH$ where, in each formula, R represents a divalent radical, said reaction product containing trialkanolamino radicals derived from said first alkanolamine and alkanolamino radicals derived from said second alkanolamine and said reaction product having a ratio of trialkanolamino radicals to atoms of said metal in the range 0.5:1 to 1.5:1 and a ratio of alkanolamino radicals to atoms of said metal in the range 0.2:1 to 2.0:1.

* * * * *